US008206146B2

(12) United States Patent
Jenko et al.

(10) Patent No.: US 8,206,146 B2
(45) Date of Patent: Jun. 26, 2012

(54) MOLD-TOOL SYSTEM HAVING A MANIFOLD BODY DEFINING UNINTERRUPTED MELT CHANNELS

(75) Inventors: Edward Joseph Jenko, Essex, VT (US); James Osborne Plumpton, Enosburg Falls, VT (US); Patrice Fabien Dezon-Gaillard, Jericho, VT (US); Abdeslam Bouti, Swanton, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 37 days.

(21) Appl. No.: 12/953,611

(22) Filed: Nov. 24, 2010

(65) Prior Publication Data
US 2011/0135779 A1    Jun. 9, 2011

Related U.S. Application Data

(60) Provisional application No. 61/392,506, filed on Oct. 13, 2010, provisional application No. 61/267,581, filed on Dec. 8, 2009.

(51) Int. Cl.
*B29C 45/22* (2006.01)

(52) U.S. Cl. ............................. 425/572; 425/588
(58) Field of Classification Search .............. 425/572, 425/588
See application file for complete search history.

(56) References Cited

U.S. PATENT DOCUMENTS

| 4,219,323 | A | * | 8/1980 | Bright et al. | ............. 425/572 |
| 4,965,028 | A |   | 10/1990 | Maus et al. | |
| 5,096,411 | A | * | 3/1992 | Gellert | ............. 425/547 |
| 5,536,164 | A |   | 7/1996 | Brun, Jr. et al. | |
| 5,641,526 | A | * | 6/1997 | Gellert | ............. 425/549 |
| 5,683,731 | A |   | 11/1997 | Deardurff et al. | |
| 6,149,423 | A |   | 11/2000 | Manz | |

OTHER PUBLICATIONS

Mold Masters pamphlet entitled Your Connection! . . . To Injection Molding Excellence: Modular Manifolds & Master-Probe Nozzle Probes, Apr. 1986, pp. 11,26-29,34,35.*

* cited by examiner

*Primary Examiner* — Tim Heitbrink

(57) ABSTRACT

A mold-tool system comprising: a manifold assembly, including: a manifold body defining: an inlet assembly; outlets being set apart from the inlet assembly; and uninterrupted melt channels extending between the inlet assembly and the outlets.

7 Claims, 5 Drawing Sheets

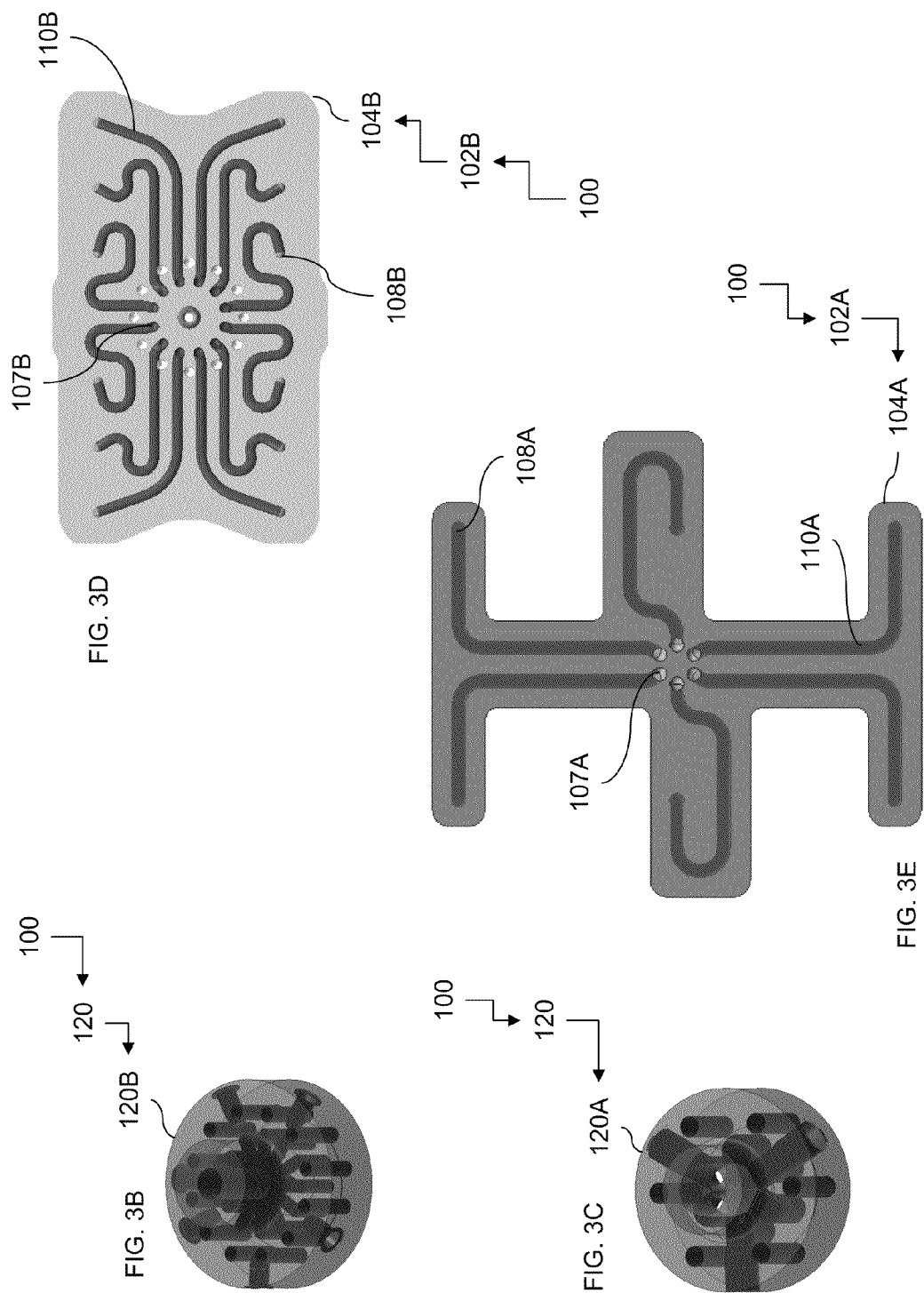

MOLD-TOOL SYSTEM HAVING A MANIFOLD BODY DEFINING UNINTERRUPTED MELT CHANNELS

CROSS-REFERENCE TO RELATED PATENT APPLICATION(S)

This patent application is a continuation-in-part patent application of prior U.S. Patent Application No. 61/392,506 filed Oct. 13, 2010 and a continuation-in-part of prior U.S. Patent Application No. 61/267,581 filed Dec. 8, 2009. This patent application also claims the benefit and priority dates of prior U.S. Patent Application No. 61/392,506 filed Oct. 13, 2010 and Patent No. 61/267,581 filed Dec. 8, 2009.

TECHNICAL FIELD

An aspect generally relates to (but is not limited to) mold-tools systems including (but not limited to) a mold-tool system having a manifold body defining uninterrupted melt channels.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' concept so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The amount of total clamp force is determined by the projected area of the part being molded. This projected area is multiplied by a clamp force of from two to eight tons for each square inch of the projected areas. As a rule of thumb, four or five tons per square inch can be used for most products. If the plastic material is very stiff, more injection pressure may be needed to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

U.S. Pat. No. 5,536,164 discloses a manifold assembly for supplying plastic material from a plastic source to a mold assembly in an injection molding machine includes a flexible manifold having an interior conduit connected between the plastic source and the mold assembly. The flexible manifold is configured to define an input connector, a first curved segment attached to the input connector, a second curved segment, an output connector attaching the second curved segment to the mold assembly, and an intermediary segment connecting the first and second curved segments. This provides the flexible manifold with a generally S-shaped configuration that flexes with temperature changes to maintain a substantially constant positioning between the input connector and the output connector, preventing thermally induced movement of the mold assembly with respect to the input connector as heated plastic is injected through the conduit.

U.S. Pat. No. 5,738,149 discloses a manifold assembly for supplying plastic material from a plastic source to a mold assembly in an injection molding machine includes a flexible manifold having an interior conduit connected between the plastic source and the mold assembly. The flexible manifold is configured to define an input connector, a first curved segment attached to the input connector, a second curved segment, an output connector attaching the second curved segment to the mold assembly, and an intermediary segment connecting the first and second curved segments. This provides the flexible manifold with a generally S-shaped configuration that flexes with temperature changes to maintain a substantially constant positioning between the input connector and the output connector, preventing thermally induced movement of the mold assembly with respect to the input connector as heated plastic is injected through the conduit.

U.S. Pat. No. 6,149,423 discloses the hot channel die is arranged within a casing filled with oil. In the hollow space filled with oil, baffles are installed which effect a current of the oil directed toward the two ends of the die. For this purpose, the heating element is arranged on the underside of the casing. The discharge sleeve, which introduces the liquid plastic from the feeding screw, discharges into the hollow body, which is mounted in a recess in the hot runner plate of a hot channel injection molding die. The distribution conduits, which are constructed as curved tubes, are installed on the discharge sleeve, and lead to the side wall, against which the rear ends of the injection nozzles lie. The hollow space is filled with a heat-conducting medium, for example oil, which is heated by a heater and uniformly circulated within the hollow space by convention or motorized circulation. Baffles optimize the circulation of the medium and its return guidance to the heater.

U.S. Pat. No. 5,683,731 discloses a redistributing device for use with melt flow exhibiting boundary layer flow and centralized flow comprises a body including a melt flow inlet end and a plurality of melt flow outlets. A first flow diverter is included for distributing at least the boundary layer flow among the plurality of the melt flow outlets. A second flow diverter is included for distributing at least the centralized flow among the plurality of melt flow outlets.

U.S. Pat. No. 4,965,028 discloses a method and apparatus for thermoplastic multigated single cavity or multicavity injection molding. A plasticated melt flows along a melt distributing passageway, and enters through a plurality of gates associated with and enters through a plurality of gates associated with one or more mold cavity. Melt temperature is maintained by means of manifold heaters, bushing heater band and, most preferably, heated probe. A unique melt conditioning element placed just upstream of gate forces the melt to enter a plurality of inlet melt channels and flow through a region of constricted cross section and/or angular change of flow direction formed by the geometric relationship of a bushing wall to said element. The result is to provide, by design, various degrees of melt heating, melt filtration, and melt homogenization.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

The inventors believe that known melt channel layouts used in known hot runner system create a mass imbalance. Every hot runner with multiple drops tries to divide the melt such that each drop gets an equal amount of resin. The problem is believed to be that most all intersections are designed to perfectly geometrically divide the melt flow, but are dividing a non homogeneous melt flow front. In addition, each melt channel splits the melt flow front and becomes more and more non homogeneous, therefore the more splits there are the more imbalance exists in the hot runner. Melt channel intersections or splits are typically the highest stress areas in the known manifold. As the inventors see more challenging applications, the inventors see the requirement for higher injection pressures. Therefore the manifold material strength needs to increase to support these larger stresses. The higher strength material costs more money, and is counter to our goal of reducing our manufacturing cost of a hot runner.

FIG. 1A depicts a schematic representation of a known mold-tool system (1). The mold-tool system (1) includes a melt-distribution assembly (2), which includes a manifold body. The manifold body is of the type known as a gun drilled manifold body. An inlet assembly (3) includes an inlet (4) defined by the manifold body of the manifold assembly (2). The manifold body also defines outlets (6A, 6B, 6C, 6D). A melt channel (7) is defined by the manifold body. The melt channel (7) extends from the inlet (4) along two separate directions toward split (9A, 9B). The melt channel (7) splits at each split (9A, 9B) into four separate directions. For example, the melt channel (7) divides from the split (9A) into four directions in which two of the directions meet up with additional splits (10A, 10B). A split is an interruption or an intersection in the melt channel (7). The melt channel (7) further divides out from the splits toward four outlets (depicted but not identified). A heater (12) is attached to the manifold assembly (2).

FIG. 1B depicts a schematic representation of thermal profiles (14A, 14B, 14C, 14D) of outputs (6A, 6B, 6C, 6D), respectively, of the known mold-tool system (1) of FIG. 1A. It appears that different outlets of the manifold body depicted in FIG. 1A each have different temperature profiles in which some outlets are hotter than other outlets. It will be appreciated that a colder outlet may result in a light weight molded part, whereas hotter outlets may results in relatively heavier molded parts because more of the melt may enter into the mold cavity of a mold assembly that fluidly communicates with the outlet. This is known as unbalanced filling of the mold assembly, and the inventors believes that the reason for this is as result of the splits (9A, 9B, 10A, 10B); that is, splitting and re-splitting of the melt flowing along the melt channel (7). It is believes that another issue that is created is that the splits create dead zones which are low flow or no flow portions of the melt in the melt channel 97), which may result in degradation of color changes, etc as a result of a melt that hangs and fails to move quickly enough from the melt channel (7) fast enough.

According to one aspect, there is provided a mold-tool system comprising: a manifold assembly, including: a manifold body defining: an inlet assembly; outlets being set apart from the inlet assembly; and uninterrupted melt channels extending between the inlet assembly and the outlets.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIGS. 3A, 3B, 3C, 3D, 3E depict additional aspects of the mold-tool system (100) of FIG. 2A.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

Figure 2A:
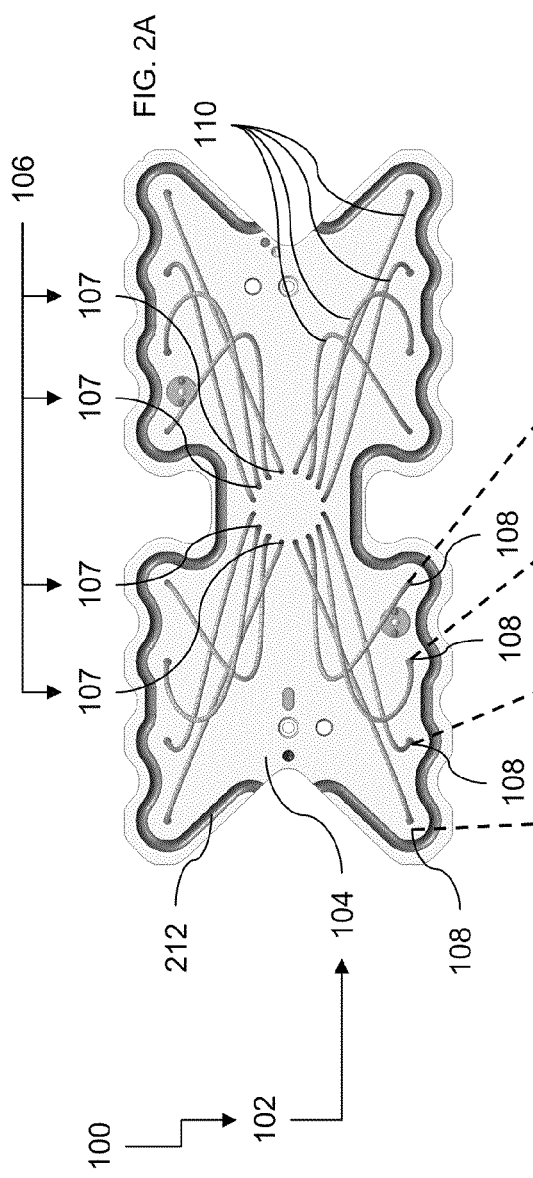
FIG. 2A depicts a schematic representation of a mold-tool system (100)

FIG. 2A depicts the schematic representation of the mold-tool system (100). The mold-tool system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3$^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

The mold-tool system (100) may be implemented as a hot runner system or may be implemented as a cold runner system. The mold-tool system (100) is a system that is supported by a platen assembly (known but not depicted) of a molding system (known and not depicted), such as an injection molding system.

The mold-tool system (100) may include (and is not limited to): a melt-distribution assembly (102). The melt-distribution assembly (102) may include (but is not limited to): a manifold body (104). The manifold body (104) may define: (i) an inlet assembly (106), outlets (108) that are set apart from the inlet assembly (106), and (iii) uninterrupted melt channels (110) extending between the inlet assembly (106) and the outlets (108).

Figures 1A, 1B:
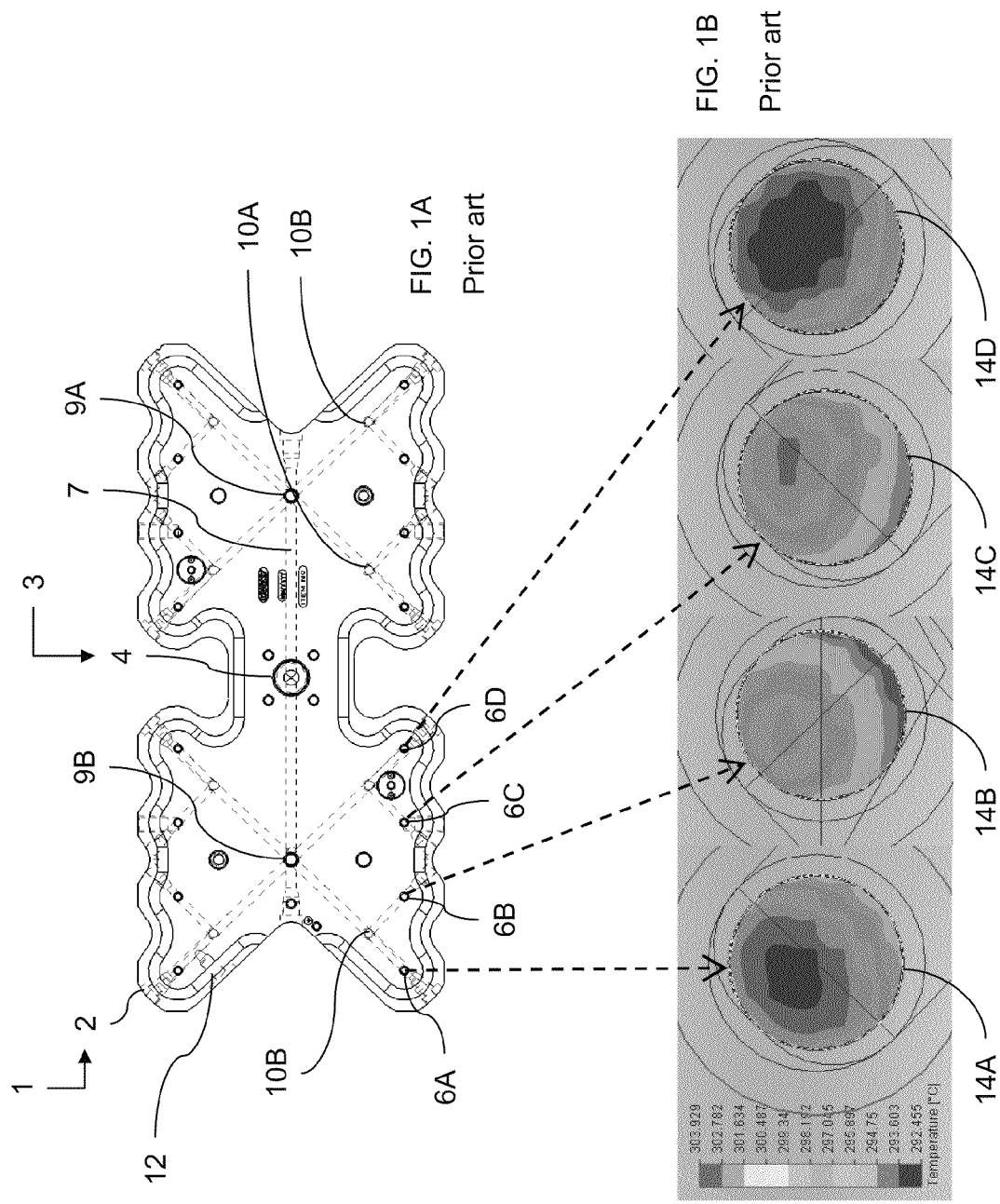
FIG. 1A depicts a schematic representation of a known mold-tool system (1)
FIG. 1B depicts a schematic representation of thermal profiles of outputs of the known mold-tool system (1) of FIG. 1A.

The definition of the uninterrupted melt channels (110) is as follows: there are no melt-channel intersections between the uninterrupted melt channels (110) so that there is no mixing or flow of a melt (resin) between the uninterrupted melt channels (110); that is, there is no inter-channel mixing between the uninterrupted melt channels (110). The uninterrupted melt channels (110) are channels that have no breaks in the uninterrupted melt channels (110) so as to avoid causing a split (or a branching) in the flow of a melt flowing along the uninterrupted melt channels (110). A technical effect of the foregoing is that each of the outlets (108) may have similar heat profiles. The manifold body (104) may be manufactured using 3D manufacturing methods or by gun drills, etc. In sharp contrast to FIG. 1A, there are no melt channel splits in the manifold body (4) of the mold-tool system (100) of FIG. 2A. Each of the uninterrupted melt channels (110) is a single contiguous melt channel from inlet to outlet for each drop leading into a mold cavity of a mold assembly (known and not depicted). By removing the splits from the manifold body, high stress intersections may be removed or reduced, and the imbalance caused by multiple melt channel splits may also be removed or reduced. Another benefit of not having any split in the manifold body is that the size of the melt channel may be kept relatively smaller if so desired (so that a single large melt channel may not be required to carry the melt to the outlets), and each of the uninterrupted melt channels (110) may need to be large enough to carry the melt to a single outlet. By reducing the size of the uninterrupted melt channels (110), the stress may be reduced, and may be able to use weaker, cheaper, and thinner manifold material for the manifold body (104). The manifold body (104) is depicted having sixteen outlets (108). The known mold-tool system (1) has relatively poorer thermal homogeneity while the mold-tool system (100) has relatively improved uniform thermal uniformity for the outputs. It is preferred that each of the uninterrupted melt channels (110) is if identical length for balanced melt flow so that the temperature profile for each outlet is similar. Each of the uninterrupted melt channels (110) continues uninterrupted from a dedicated inlet and a dedicated outlet. the inlet assembly (106) is configured to divide a flow of melt from to the outlets (108) into geometrically symmetrical portions equivalent to a number of outlets (108).

Figure 2B:
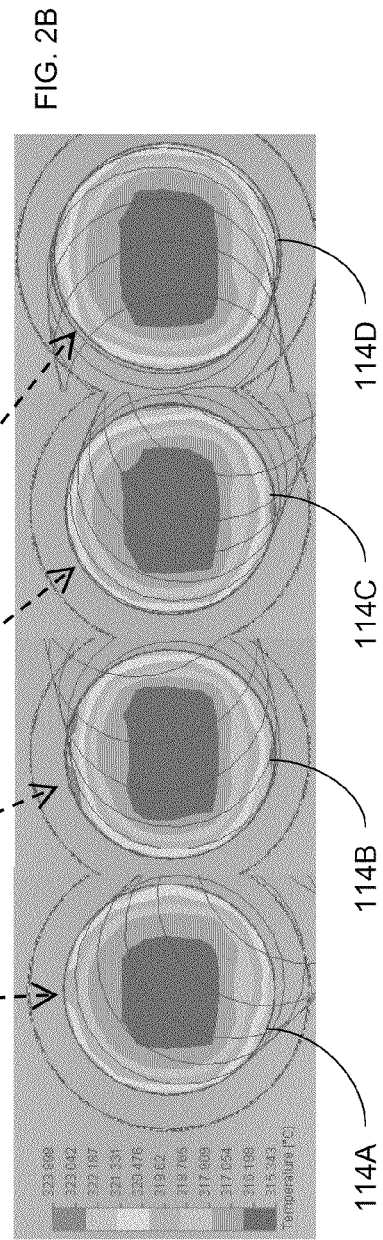
FIG. 2B depicts a schematic representation of thermal profiles of outputs of the mold-tool system (100) of FIG. 2A.

FIG. 2B depicts the schematic representation of thermal profiles (114A, 114B, 114C, 114D) of four of the outlets (108), respectively, of the mold-tool system (100) of FIG. 2A. The inventors have determined that by using the mold-tool system (100), each of the outlets (108) of the manifold body (104) each have a similar temperature profile thus avoiding a situation where some outlets are hotter or cooler than other outlets. This arrangement advantageously permits improved balanced filling of the mold assembly by avoiding the use of splits in the uninterrupted melt channels (110).

According to one example of the mold-tool system (100), the inlet assembly (106) includes a single inlet, and the uninterrupted melt channels (110) connect each of outlets (108) to the single inlet. A heating element (212) may be attached or connected to the manifold body (104). According to another example of the mold-tool system (100), the inlet assembly (106) includes inlets (107), the uninterrupted melt channels (110) extend between the inlets (107) and the outlets (108), and each of the uninterrupted melt channels (110) has a exclusive pair of inlet and outlet being selected from the inlets (107) and the outlets (108), and the exclusive pair of inlet and outlet are unassociated with any other uninterrupted melt channel.

Figure 2C:
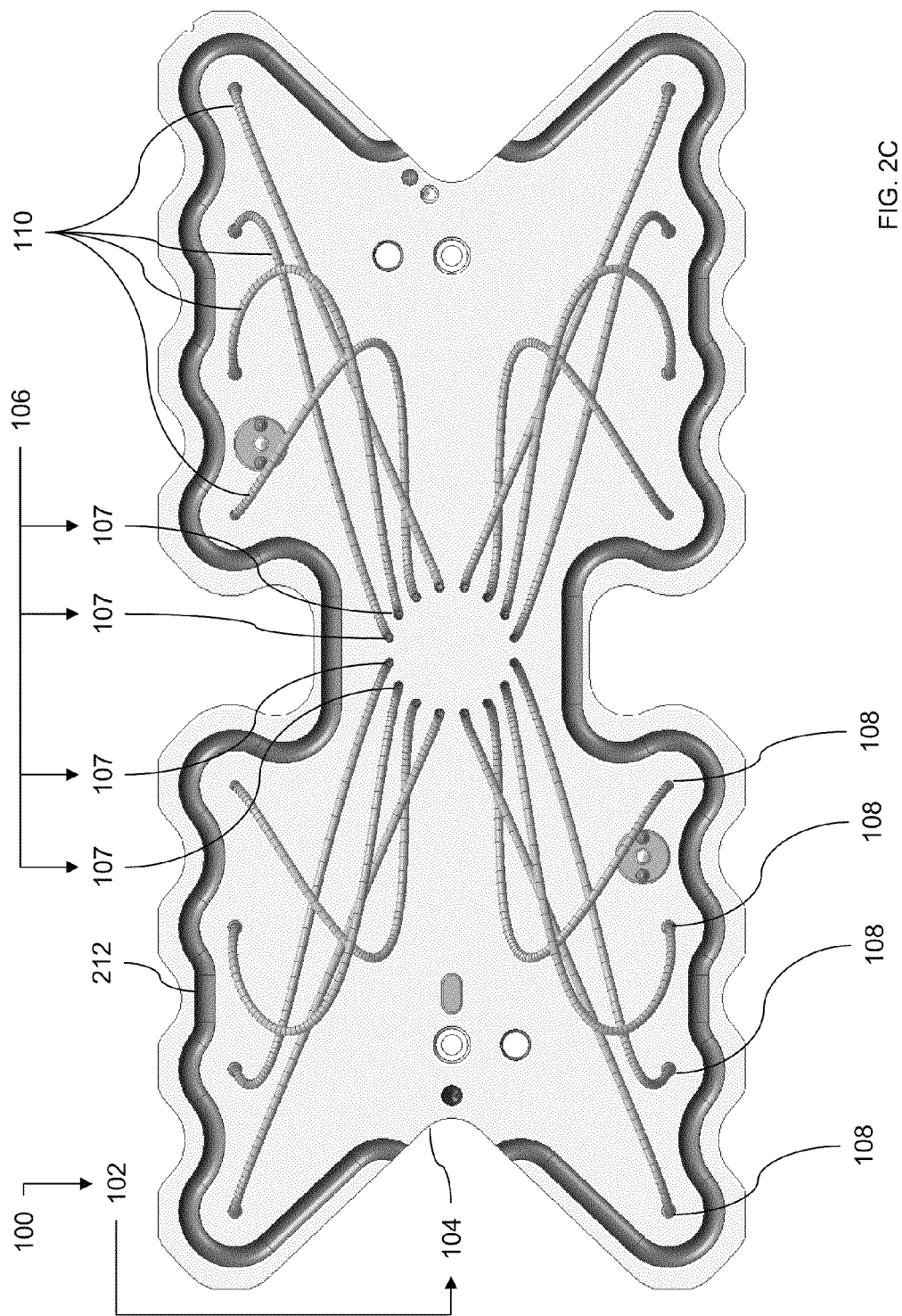
FIG. 2C depicts a close up view of the mold-tool system (100) of FIG. 2A.

FIG. 2C depicts a close up view of the mold-tool system (100) of FIG. 2A.

FIGS. 3A, 3B, 3C, 3D, 3E depict additional aspects of the mold-tool system (100) of FIG. 2A.

Figure 3A:
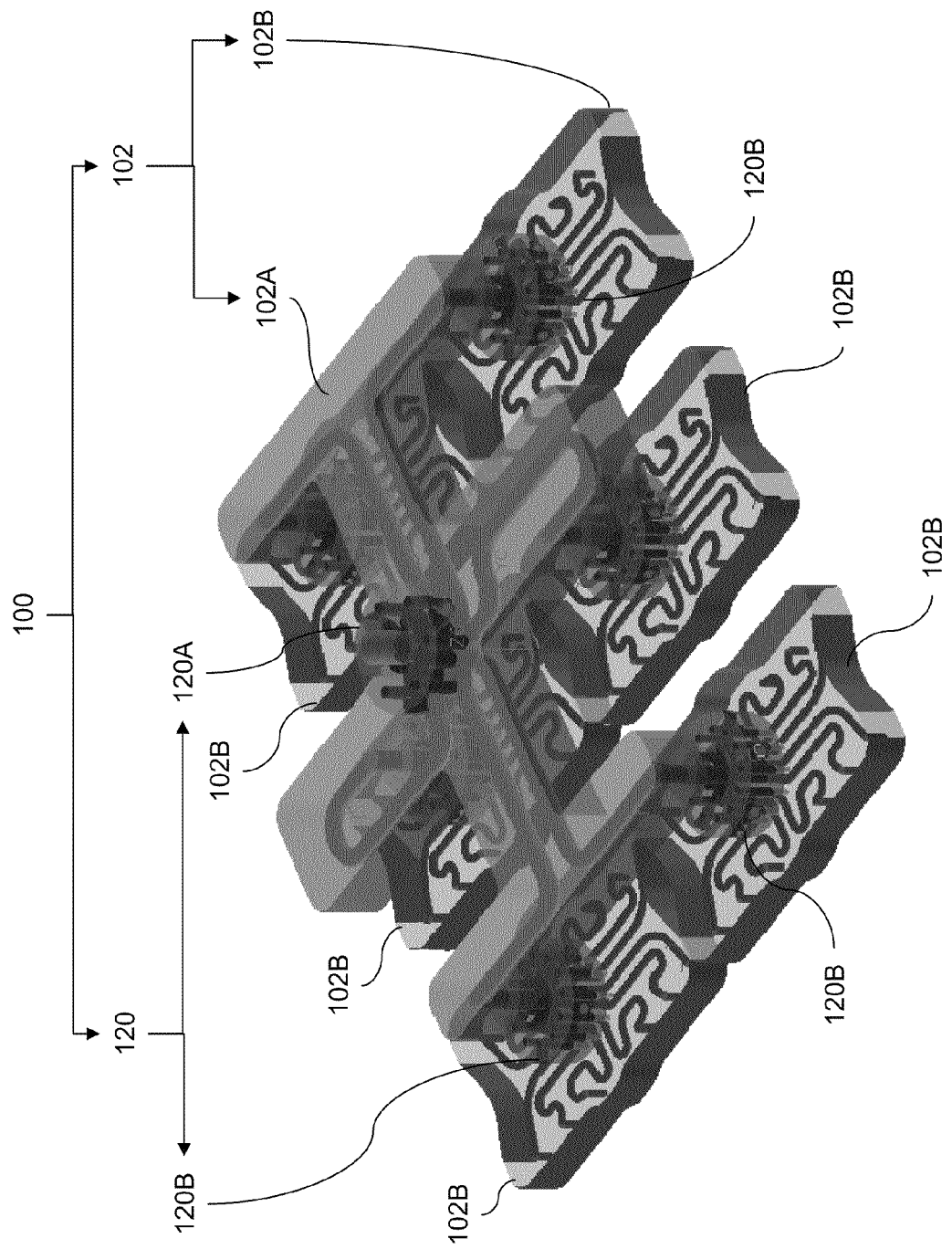

FIG. 3A depicts the perspective view of the mold-tool system (100), in which the mold-tool system (100) is adapted so that the melt-distribution assembly (102) includes (and is not limited to the following components: (i) an upper melt-distribution assembly (102A) that has uninterrupted melt channels (110A), (ii) a plurality of lower melt-distribution assemblies (102B) each of which has uninterrupted melt channels (110B), (iii) a melt distributor assembly (120) that has (a) an upper melt distributor assembly (120A), and (b) a plurality of lower melt distributor assemblies (120B). the upper melt distributor assembly (120A) is attached to the upper melt-distribution assembly (102A). The plurality of lower melt distributor assemblies (120B) connects the upper melt-distribution assembly (102A) to the plurality of lower melt-distribution assemblies (102B). It will be appreciated that FIG. 2A depicts an example of a mold-tool system (100) that is structured for a single manifold arrangement for 16 outputs, while FIG. 3A depicts an example of a mold-tool system (100) that is structured for a multiple manifold arrangement (that is, a cross manifold to sub manifold arrangement). Each of the examples uses the uninterrupted melt channels (110).

FIG. 3B depicts a close up perspective view of a lower melt distributor assembly (120B).

FIG. 3C depicts a close up perspective view of the upper melt distributor assembly (120A).

FIG. 3D depicts a top view of the lower melt-distribution assembly (102B).

FIG. 3E depicts a top view of the upper melt-distribution assembly (102A).

It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising". It is noted that the foregoing has outlined the non-limiting embodiments (examples). The description is made for particular non-limiting embodiments (examples). It is understood that the non-limiting embodiments are merely illustrative as examples.

What is claimed is:

1. A mold-tool system (100), comprising:
a melt-distribution assembly (102), including:
a manifold body (104) defining:
an inlet assembly (106);
outlets (108) being set apart from the inlet assembly (106); and
uninterrupted melt channels (110) extending between the inlet assembly (106) and the outlets (108),
wherein the uninterrupted melt channels (110) have no melt-channel intersections between the uninterrupted melt channels (110) so that there is no mixing of a melt between the uninterrupted melt channels (110),
whereby each of the outlets (108) have similar heat profiles.

2. The mold-tool system (100) of claim 1, wherein:
the inlet assembly (106) includes a single inlet; and
the uninterrupted melt channels (110) connect each of the outlets (108) to the single inlet.

3. The mold-tool system (100) of claim 1, wherein:
the inlet assembly (106) includes inlets (107); and
the uninterrupted melt channels (110) extend between the inlets (107) and the outlets (108);
each of the uninterrupted melt channels (110) having an exclusive inlet and outlet being selected from the inlets (107) and the outlets (108), and the exclusive inlet and outlet are unassociated with any other uninterrupted melt channel.

4. The mold-tool system (100) of claim 1, wherein:
each of the uninterrupted melt channels (110) continues uninterrupted from a dedicated inlet and a dedicated outlet.

5. The mold-tool system (100) of claim 1, wherein:
the inlet assembly (106) is configured to divide a flow of melt from to the outlets (108) into geometrically symmetrical portions equivalent to a number of outlets (108).

6. The mold-tool system (100) of claim 1, wherein:
the melt-distribution assembly (102) includes:
an upper melt-distribution assembly (102A) having the uninterrupted melt channels (110A);
a plurality of lower melt-distribution assemblies (102B) each having the uninterrupted melt channels (110B);
the upper melt distributor assembly (120A) is attached to the upper melt-distribution assembly (102A); and
the plurality of lower melt distributor assemblies (120B) connects the upper melt-distribution assembly (102A) to the plurality of lower melt-distribution assemblies (102B).

7. The mold-tool system (100) of claim 1, wherein:
each of the uninterrupted melt channels (110) is a single contiguous melt channel from inlet to outlet for each drop leading into a mold cavity of a mold assembly.

* * * * *